(12) United States Patent
Choi et al.

(10) Patent No.: US 12,449,764 B2
(45) Date of Patent: Oct. 21, 2025

(54) IMAGE FORMING APPARATUS TO REMOVE FOREIGN BODY FROM PRINT MEDIA DETECTION SENSOR

(71) Applicant: Hewlett-Packard Development Company, L.P., Spring, TX (US)

(72) Inventors: Youngjun Choi, Seongnam Si (KR); Taegon Kim, Seongnam Si (KR); Seungkyu Lee, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 28 days.

(21) Appl. No.: 18/700,117

(22) PCT Filed: Mar. 28, 2022

(86) PCT No.: PCT/US2022/022159
§ 371 (c)(1),
(2) Date: Apr. 10, 2024

(87) PCT Pub. No.: WO2023/063989
PCT Pub. Date: Apr. 20, 2023

(65) Prior Publication Data
US 2025/0231527 A1    Jul. 17, 2025

(30) Foreign Application Priority Data
Oct. 12, 2021  (KR) .................. 10-2021-0134740

(51) Int. Cl.
*G03G 21/00* (2006.01)
*G01N 21/00* (2006.01)
(Continued)

(52) U.S. Cl.
CPC .......... *G03G 21/206* (2013.01); *G01N 21/15* (2013.01); *G01N 21/86* (2013.01); *G03G 2215/00616* (2013.01); *G03G 2221/1645* (2013.01)

(58) Field of Classification Search
CPC .......... G03G 15/2017; G03G 15/5029; G03G 21/206; G03G 2215/00611;
(Continued)

(56) References Cited

U.S. PATENT DOCUMENTS

| 2010/0226702 A1 | 9/2010 | Nuriel et al. |
| 2014/0314438 A1 | 10/2014 | Maeda et al. |

(Continued)

FOREIGN PATENT DOCUMENTS

WO   WO-2020146186 A1 * 7/2020 ............... B65H 7/14

*Primary Examiner* — Robert B Beatty
(74) *Attorney, Agent, or Firm* — Brooks, Cameron & Huebsch, PLLC

(57) ABSTRACT

An image forming apparatus including a fixer, a print medium detection sensor adjacent to the fixer and to detect movement of a print medium, a fan adjacent to the fixer and to the print medium sensor, and a processor to control the image forming apparatus to heat the fixer for an image forming job, and based on a voltage value of an output signal of the print medium detection sensor not being in a predetermined range, to drive the fan to remove a foreign body on a surface of the print medium detection sensor so that the voltage value of the output signal of the print medium detection sensor is in the predetermined range.

15 Claims, 8 Drawing Sheets

(51) Int. Cl.
*G01N 21/15* (2006.01)
*G01N 21/86* (2006.01)
*G03G 21/20* (2006.01)

(58) Field of Classification Search
CPC ... G03G 2215/00616; G03G 2221/1645; B41J 29/377; G01N 21/15; G01N 21/86; G01N 2021/151; G01N 2021/155; G01N 2021/157; G01N 2021/158; G01N 2021/8663
USPC ..... 399/92, 98; 356/229, 433, 434, 445, 448
See application file for complete search history.

(56) References Cited

U.S. PATENT DOCUMENTS

| | | | |
|---|---|---|---|
| 2014/0314454 A1 | 10/2014 | Fukushi | |
| 2016/0041452 A1* | 2/2016 | Nomura | G01S 17/88 356/5.01 |
| 2016/0282807 A1 | 9/2016 | Kinoshita et al. | |
| 2018/0203402 A1* | 7/2018 | Okuma | G03G 15/5029 |
| 2020/0026236 A1* | 1/2020 | Shigihara | G03G 15/5054 |

* cited by examiner

IMAGE FORMING APPARATUS TO REMOVE FOREIGN BODY FROM PRINT MEDIA DETECTION SENSOR

BACKGROUND

An image forming apparatus refers to an apparatus which prints print data generated on a terminal apparatus as a computer on a printing medium. Examples of such an image forming apparatus may include a copier, a printer, a facsimile, a multi-function peripheral (MFP) serving functions of these in combination as one apparatus, and the like.

DETAILED DESCRIPTION

Hereinafter, various examples will be described with reference to the drawings. The examples described hereinafter may be modified and practiced in various different aspects.

In the disclosure, the expression that a certain component is "connected" to another component includes a case where the components are "directly connected to each other", and also a case where the components are "connected to each other with another component interposed therebetween". In addition, when a certain component "includes" another certain component, it implies that a still another component may be further included, rather than excluding it, unless otherwise noted. Meanwhile, each example may be implemented or operated independently or the examples may also be implemented or operated in combination.

In the disclosure, an "image forming job" may refer to various jobs relating to an image such as forming of an image or generating, saving, or transmitting of an image file (e.g., printing, scanning, or faxing), and the "job" may refer to the image forming job, and also refer to all of processes necessary for performing the image forming job.

The "print data" may refer to data converted into a format that is printable by a printer. Meanwhile, if a printer supports direct printing, a file itself may be the print data.

The "image forming apparatus" may refer to an apparatus which prints print data generated on a terminal apparatus such as a computer on a recording paper. Examples of such an image forming apparatus may include a copier, a printer, a facsimile, a scanner, and a multi-function peripheral (MFP) realizing functions of these as one apparatus in combination.

An aspect of the disclosure is to improve an erroneous operation occurring due to contamination of a print medium detection sensor due to heat of a fixer.

Figure 1:
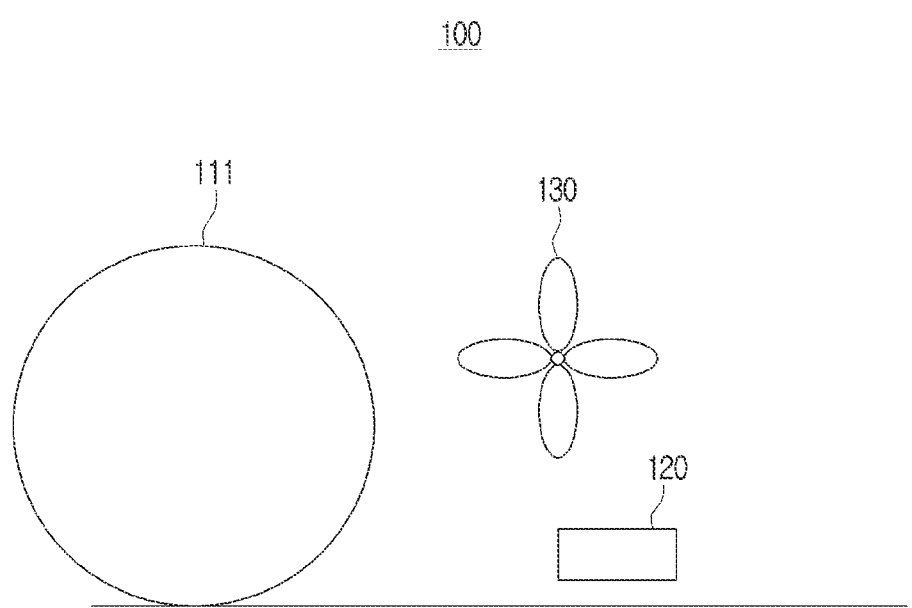
FIG. 1 is a diagram illustrating arrangement of constituents of an image forming apparatus according to an example.

FIG. 1 is a diagram illustrating arrangement of constituents of an image forming apparatus according to an example.

Referring to FIG. 1, an image forming apparatus 100 may include a fixer 111, a print medium detection sensor 120, and a fan 130.

The fixer 111 may be heated for an image forming job. The image forming apparatus 100 may perform the image forming job of forming an image on a print medium (e.g., paper) by repeatedly performing processes of charging, exposing, developing, transferring, and fixing in sequence by using an image forming engine. The image forming engine may include a photosensitive drum, a transfer device, and the fixer 111. The image forming apparatus 100 may apply a voltage corresponding to image data to the photosensitive drum and the photosensitive drum may transfer a toner to the transfer device according to the applied voltage. The transfer device may transfer the transferred toner to the print medium and the fixer 111 may be heated to fix the toner transferred to the print medium.

The print medium detection sensor 120 may be disposed in adjacent to the fixer 111 and detect the movement of the print medium on which the toner is fixed and an image is formed through the fixer 111. For example, the print medium detection sensor 120 may be implemented as a photosensor such as a photointerrupter. In other words, the print medium detection sensor 120 may detect presence or absence of the print medium in a detection region according to whether light emitted from a light emitting unit is detected from a light receiving unit. For example, the image forming apparatus 100 may detect that the print medium is located when light is detected from the light receiving unit of the photosensor and detect that the print medium is located when the light is not detected from the light receiving unit, depending on the implementation method. If normal movement of the print medium is detected by the print medium detection sensor 120, the image forming apparatus 100 may perform the image forming job on a next print medium.

The fan 130 may be disposed in adjacent to the fixer 111 and the print medium detection sensor 120. For example, the image forming apparatus 100 may include one fan 130 and drive the fan 130 to decrease a temperature of the fixer 111 and remove a foreign body of the print medium detection sensor 120. Alternatively, the image forming apparatus 100 may include a plurality of fans 130 such as the fan 130 for decreasing the temperature of the fixer 111, the fan 130 for removing a foreign body of the print medium detection sensor 120, and the like.

As described above, the image forming apparatus 100 may heat the fixer 111 to fix the toner onto the print medium during the image forming job. When the fixer 111 is heated, dew condensation may be generated on a surface of the print medium detection sensor 120 due to a rapid increase in temperature around the fixer. Alternatively, a toner powder or fine foreign body may be attached to the surface of the print medium detection sensor 120 due to driving and heating of the fixer 111. In the disclosure, all of the toner powder, the fine foreign body, the dew condensation phenomenon, and the like are referred to as the foreign body.

The print medium detection sensor 120 may not receive normal light from the light receiving unit due to foreign body generated on the surface thereof. Accordingly, an output value of the print medium detection sensor 120 may not be beyond a normal range. In an example, a light amount detected from the print medium detection sensor 120 may be reduced due to the foreign body attached to the surface of the print medium detection sensor 120 and the print medium detection sensor 120 may output an abnormal output value. If the image forming apparatus 100 is implemented so that the print medium is located when the light is not detected by the print medium detection sensor 120, the image forming apparatus 100 may recognize that the print medium is located although the print medium is not located in a detection region, and stop the image forming job.

Accordingly, the disclosure may improve the abnormal operation of the image forming apparatus 100 by removing the foreign body attached to the surface of the print medium detection sensor 120 by using the fan 130.

Figure 2:
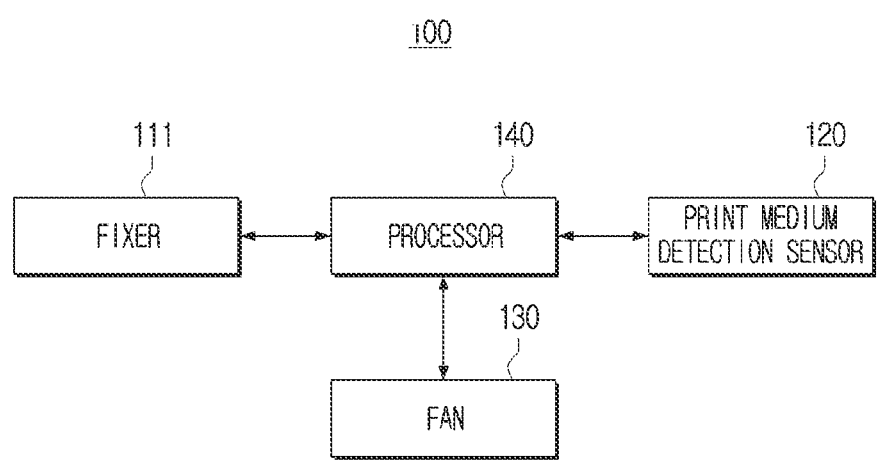
FIG. 2 is a block diagram illustrating a configuration of the image forming apparatus according to an example.

FIG. 2 is a block diagram illustrating a configuration of the image forming apparatus according to an example.

Referring to FIG. 2, the image forming apparatus 100 may include the fixer 111, the print medium detection sensor 120, the fan 130, and a processor 140.

The fixer 111 may be heated for the image forming job. Referring to FIG. 1, the fixer 111 may be heated to fix the toner transferred onto the print medium during the image forming job.

The print medium detection sensor 120 may be disposed in adjacent to the fixer 111 and detect the movement of the print medium. For example, the print medium detection sensor 120 may be implemented as a photosensor including a photointerrupter or the like.

The fan 130 may be driven by the control of the processor 140 and remove the foreign body attached to the surface of the print medium detection sensor 120. For example, the foreign body may include dew (water) generated by the dew condensation, a toner powder, other fine foreign body, and the like.

The processor 140 may control general operations of the image forming apparatus 100. For example, the processor 140 may control the heating of the fixer 111 and control the operation of the fan 130. In addition, the processor 140 may receive an input of an output signal of the print medium detection sensor 120. The processor 140 may drive the fan 130, if a voltage value of the output signal of the print medium detection sensor 120 is not in a predetermined range. The foreign body attached to the surface of the print medium detection sensor 120 may be removed by the driving of the fan 130. When the foreign body is removed, the voltage value of the output signal of the print medium detection sensor 120 may be included in the predetermined range. The predetermined range may be a range of normal voltage value.

As an example, the processor 140 may include an analog-to-digital converter (ADC) port. The processor 140 may receive an input of the output signal of the print medium detection sensor 120 through the ADC port. The processor 140 may determine whether the voltage value of the input output signal is in the predetermined range. Alternatively, the image forming apparatus 100 may include a detection device (detection circuit) for determining whether the output signal of the print medium detection sensor 120 is in the normal range. The processor 140 may receive an input of a normality detection signal from the detection device. The processor 140 may determine whether the print medium detection sensor 120 is contaminated based on the input normality detection signal. In addition, if the voltage value of the output signal is not in the predetermined range during the image forming job, the processor 140 may stop the image forming job. A specific example of determining whether the output signal of the print medium detection sensor 120 is in the normal range will be described below.

Meanwhile, even if the processor 140 drives the fan 130 to remove the foreign body attached to the surface of the print medium detection sensor 120, the foreign body may not be sufficiently removed. If the foreign body is not removed, the output signal of the print medium detection sensor 120 may maintain an abnormal range. If the foreign body is not removed, in other words, if the output signal is maintained in the abnormal range, the processor 140 may output the information related to contamination of the print medium detection sensor 120 through an output interface.

Figure 3:
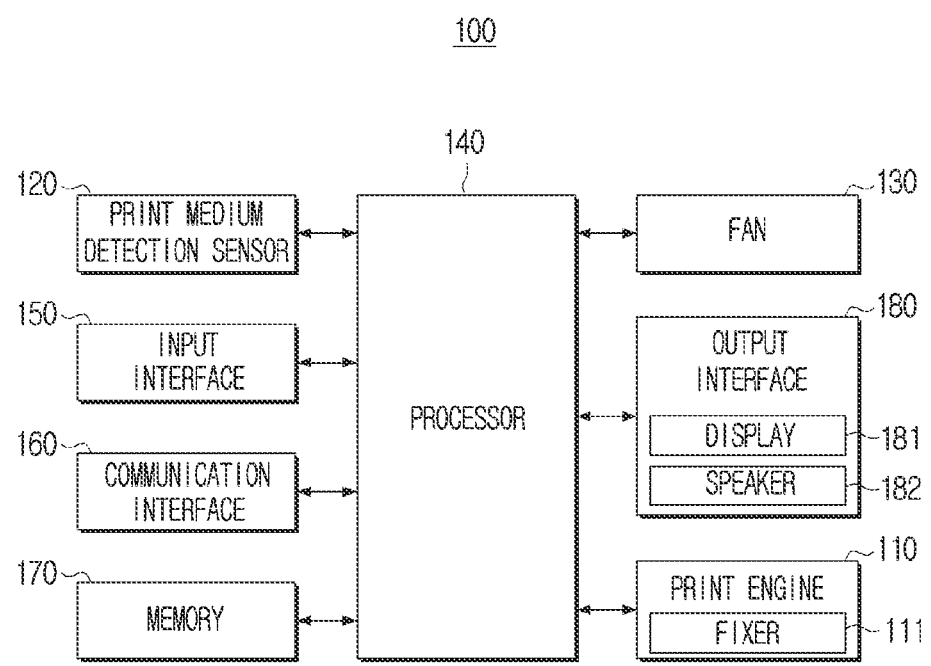
FIG. 3 is a block diagram illustrating a specific configuration of the image forming apparatus according to an example.

FIG. 3 is a block diagram illustrating a specific configuration of the image forming apparatus according to an example.

Referring to FIG. 3, the image forming apparatus may include a print engine 110, the print medium detection sensor 120, the fan 130, the processor 140, an input interface 150, a communication interface 160, a memory 170, and an output interface 180. The fixer 111 may include the print engine 110. The fixer 111 included in the print engine 110, the print medium detection sensor 120, and the fan 130 perform the same function as the fixer 111, the print medium detection sensor 120, and the fan 130 of FIG. 2, and therefore the overlapped description will not be repeated. Since the processor 140 performs the same function as the processor 140 of FIG. 2, the description in FIG. 2 will not be repeated and only the content related to the constituent elements added to FIG. 3 will be described below.

The input interface 150 may receive selection of a function and a control command of the corresponding function from a user. For example, the input interface 150 may be implemented as a keyboard, a keypad, a touch pad, a touch screen, or the like. The input interface 150 may be referred to as an inputter, an input module, an input device, or an input and output unit.

The communication interface 160 may communicate with an external apparatus. For example, the external apparatus may include a server, an AI cloud, a terminal device, and the like. The communication interface 160 may be formed to connect the image forming apparatus 100 to the external apparatus and may also be connected via a universal serial bus (USB) port or a wireless communication (e.g., Wi-Fi 802.11a/b/g/n, near field communication (NFC), or Bluetooth) port, in addition to the connection to the external apparatus via a local area network (LAN) or the Internet. The communication interface 160 may be referred to as a communicator, a communication module, a communication device, or a transceiver.

The memory 170 may store at least one instruction for the image forming apparatus 100. For example, the memory 170 may store various programs (or software) for the image forming apparatus 100 to operate according to various examples of the disclosure. In addition, the memory 170 may store print data and the like.

The output interface 180 may include a display 181 or a speaker 182. The display 181 may display a user interface window for receiving selection of a function supported by the image forming apparatus 100. Specifically, the display 181 may display a user interface window for receiving selection of various functions provided by the image forming apparatus 100. The display 181 may be a monitor such as a liquid crystal display (LCD), a cathode ray tube (CRT), or an organic light emitting diode (OLED), and may also be implemented as a touch screen for simultaneously performing a function of the input device 150. In addition, the display 181 may output information related to the contamination of the print medium detection sensor 120 as an image signal.

The speaker 182 may output state information of the image forming apparatus 100 as a sound. For example, if the image forming apparatus 100 is in an error state, the image forming apparatus may output a sound corresponding to the error state. For example, the speaker 160 may output the information related to the contamination of the print medium detection sensor 120 as an audio signal.

Hereinabove, the configuration of the image forming apparatus 100 has been described. Hereinafter, a process of determining whether the output voltage value of the print medium detection sensor 120 is abnormal will be described.

Figure 4A:
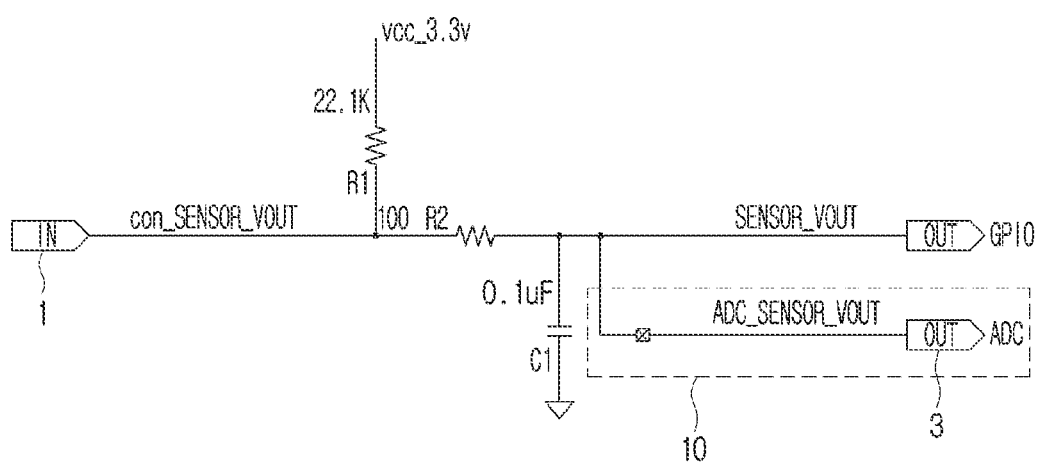
FIGS. 4A and 4B are diagrams illustrating a detection circuit for detecting presence or absence of abnormality of a voltage value of a printing medium detection sensor according to an example.
Figure 4B:
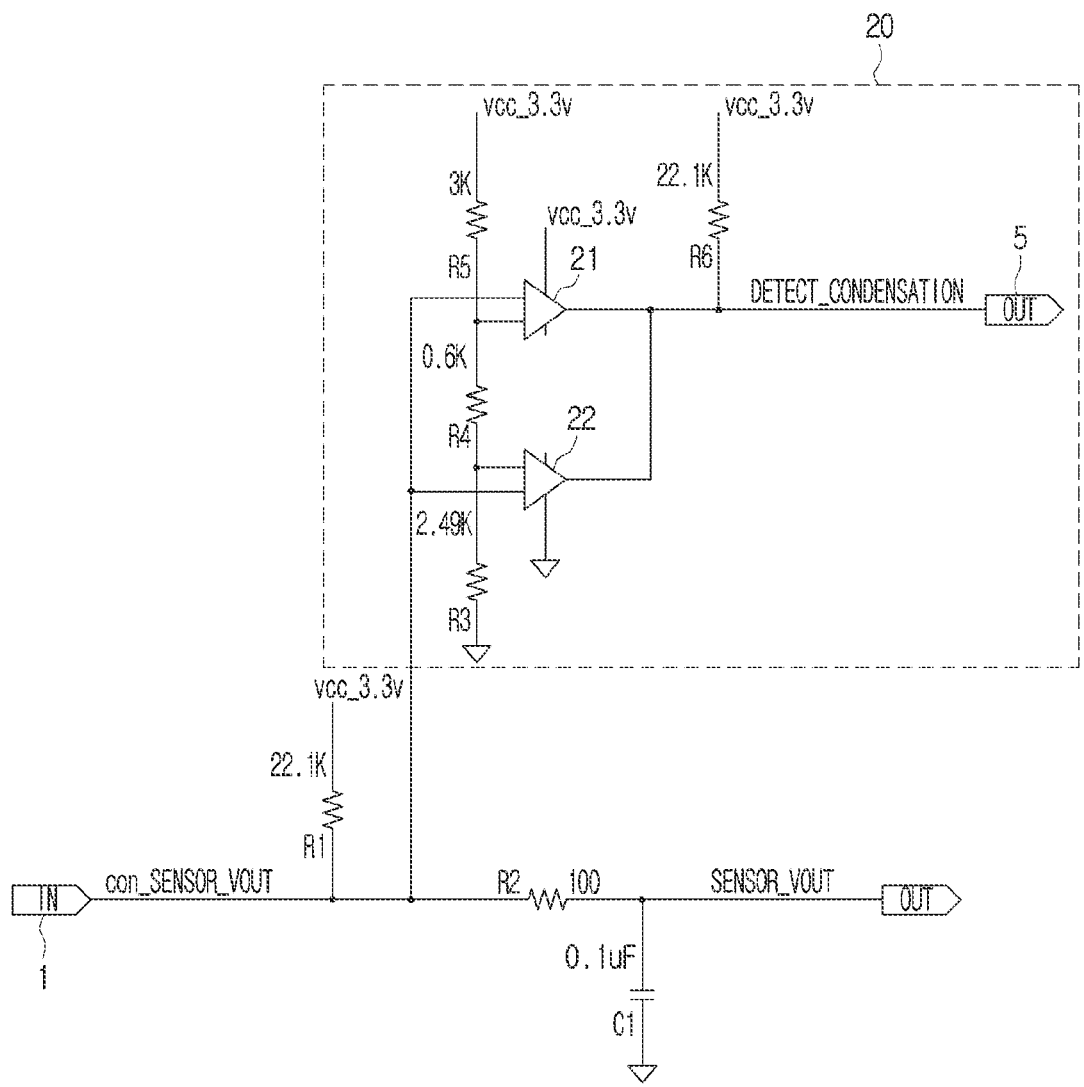

FIGS. 4A and 4B are diagrams illustrating a detection circuit for detecting presence or absence of abnormality of a voltage value of a printing medium detection sensor according to an example.

Referring to FIG. 4A, a detection circuit 10 for receiving an input of the voltage value through the ADC port of the processor is illustrated. The output signal of the print medium detection sensor may be output to an output port 1. The output signal output to the output port 1 may be a voltage value of the print medium detection sensor. The output signal may be input to a GPIO port and the ADC port of the processor. The processor may monitor the voltage value of the print medium detection sensor based on the output signal input to the ADC port. In an example, the processor may compare the voltage value of the output signal input to the ADC port with a predetermined reference value. The processor may determine whether the voltage value of the output signal input to the ADC port is in the predetermined range. If the determined voltage value is in the predetermined range, the processor may determine that the state of the print medium detection sensor is normal. However, if the determined voltage value is beyond the predetermined range, the processor may determine that the state of the print medium detection sensor is abnormal. In other words, the processor may determine that the print medium detection sensor is contaminated by the foreign body. The processor may perform the foreign body removing operation. The processor may remove the foreign body attached to the surface of the print medium detection sensor by operating the fan.

In an example, in a case where the print medium detection sensor is implemented in a structure of outputting a voltage value of a low level when detecting the print medium, if the voltage value input to the processor from the detection circuit is a high level, the processor may operate the fan separately from the image forming job. If the voltage value input to the processor from the detection circuit is reduced to the low level by the operation of the fan, the processor may stop the operation of the fan. The image forming apparatus may maintain efficiency of the image forming job, because the operation of the fan and the image forming job can be independently performed.

If the print medium detection sensor is implemented in a structure of outputting a voltage value of a low level when not detecting the print medium, the processor may operate the fan before the image forming job, in order to prevent abnormal output before the image forming job.

Referring to FIG. 4B, a detection circuit 20 including a comparator is illustrated. The output signal of the print medium detection sensor may be output to the output port 1. The output signal may be input to a negative terminal of a first comparator 21 included in the detection circuit 20 and input to a positive terminal of a second comparator 22. A first reference value of the first comparator 21 may be a high level (first value) and a second reference value of the second comparator 22 may be a low level (second value). The first reference value may be input to a positive terminal of the first comparator 21 and the second reference value may be input to a negative terminal of the second comparator 22. The second reference value may be connected to the same power line as the first reference value. However, the second reference value may be a value lower than the first reference value due to voltage distribution resistor. The first reference value may be a minimum threshold value of a high voltage output of the print medium detection sensor. The second reference value may be a maximum reference value of a low voltage output of the print medium detection sensor.

For example, the first comparator 21 may output the high signal, in a case of the minimum threshold value or less of the high voltage output. The second comparator 22 may output the high signal, in a case of the maximum threshold value or more of the low voltage output. Both the first and second comparators 21 and 22 may operate as open collector output. If the output value of the print medium detection sensor is the maximum threshold value or less of the low voltage output, the first comparator 21 may be open and the second comparator 22 may output the low signal. If the output value of the print medium detection sensor is the minimum threshold value or more of the high voltage output, the first comparator 21 may output the low signal and the second comparator 22 may be open. If the output value of the print medium detection sensor is the minimum threshold value or less of the high voltage output and is the maximum threshold value or more of the low voltage output, both the first and second comparators 21 and 22 may output the high signal. In other words, when the output value of the print medium detection sensor is between an upper limit threshold value and a lower limit threshold value, the detection circuit may output the high signal. When the high signal is input from the detection circuit (5), the processor may determine that the contamination has occurred on the print medium detection sensor and operate the fan.

In an example, the first reference value may be set to 2.6 V and the second reference value may be set to 0.6 V. If the output value of the print medium detection sensor is 0.5 V, the first comparator 21 may be open and the second comparator 22 may output the low signal. If the output value of the print medium detection sensor is 2 V, the first comparator 21 may output the low signal and the second comparator 22 may be open. If the output value of the print medium detection sensor is 1.5 V, both the first and second comparators 21 and 22 may output the high signal and the processor may operate the fan. In other words, if the low level of the output value of the print medium detection sensor is floated, the print medium detection sensor may be in the abnormal state contaminated by the foreign body. The processor may recognize the abnormal state contaminated by the foreign body by using the detection circuit and perform an operation of removing the foreign body.

When the abnormal state is recognized, the processor may temporarily stop the image forming job and perform the foreign body removing operation. In a case where it is necessary to operate the fan constantly, if the abnormal state is recognized, the image forming apparatus may increase the speed of the fan and perform the foreign body removing operation.

Meanwhile, although the image forming apparatus operates the fan, the foreign body may not be completely removed. If the foreign body is not removed, the image forming apparatus may output information related to the contamination of the print medium detection sensor. For example, the image forming apparatus may display information indicating that the print medium detection sensor is contaminated or information informing that it is necessary to perform a cleaning job through a display or output the information as an audio signal through a speaker.

Figure 5:
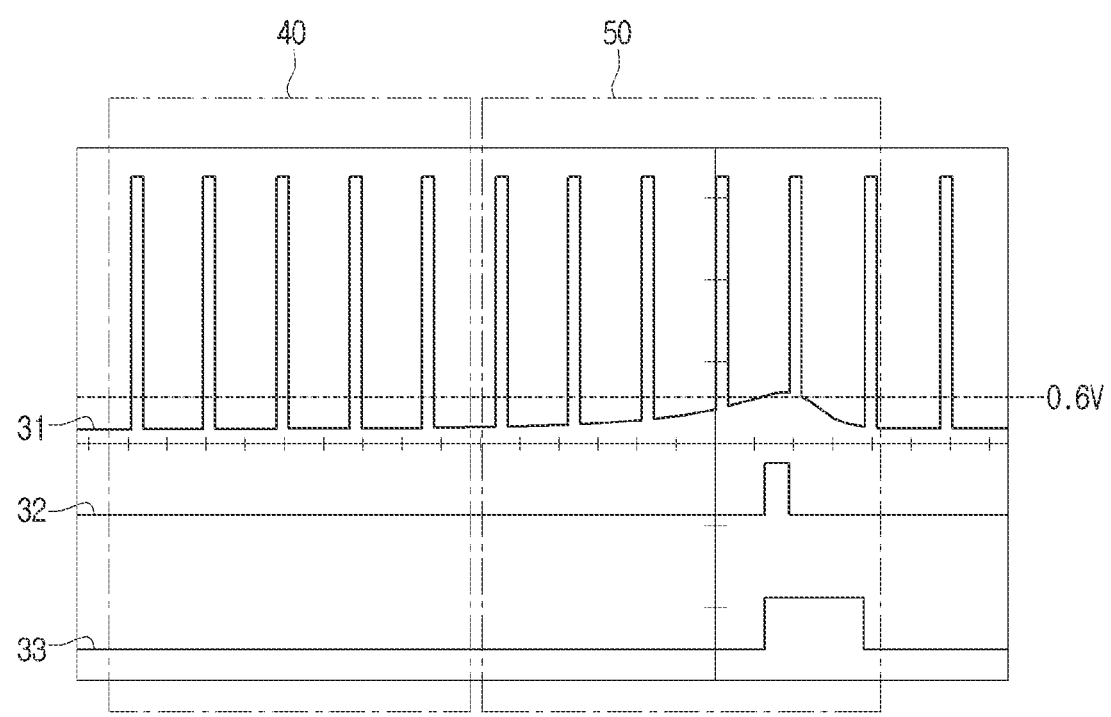
FIG. 5 is a diagram illustrating a signal waveform of the image forming apparatus to which the detection circuit is applied according to an example.

FIG. 5 is a diagram illustrating a signal waveform of the image forming apparatus to which the detection circuit is applied according to an example.

Referring to FIG. 5, an output signal 31, a contamination detection signal 32, and a fan operation signal 33 of the print medium detection sensor are illustrated. A first section 40 is a section in which the print medium detection sensor normally operates. In a second section 50, the abnormal state in which the low level of the print medium detection sensor gradually increases to exceed the maximum threshold value of the low voltage output occurs. In this case, the contamination detection signal 32 may output as the high signal and the image forming apparatus may operate the fan. If the low level of the print medium detection sensor gradually decrease due to the operation of the fan to satisfy a certain standard, the image forming apparatus may stop the operation of the fan.

Hereinabove, various examples of removing the foreign body of the print medium detection sensor have been described. Hereinafter, a method for controlling the image forming apparatus will be described.

Figure 6:
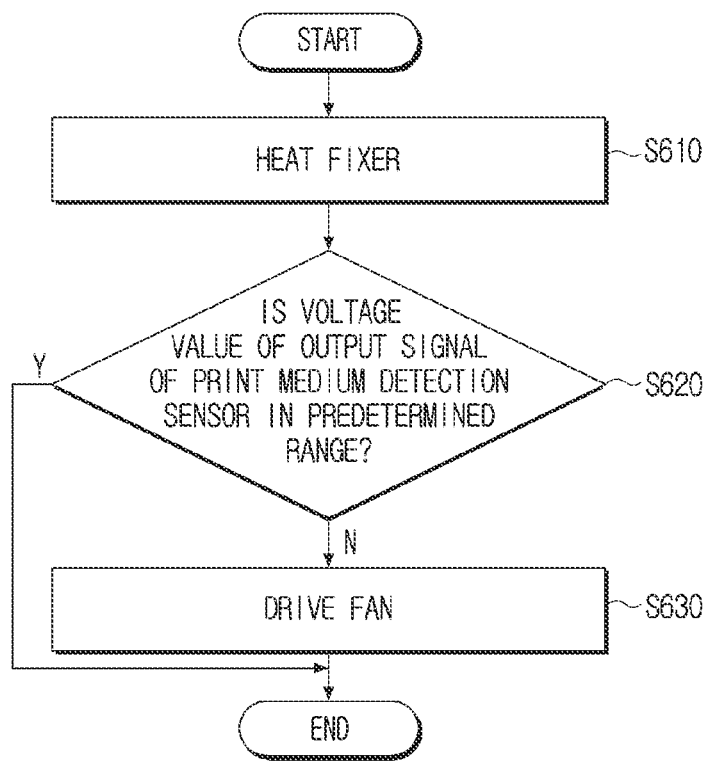
FIG. 6 is a flowchart illustrating a method for controlling the image forming apparatus according to an example.

FIG. 6 is a flowchart illustrating a method for controlling the image forming apparatus according to an example.

Referring to FIG. 6, the image forming apparatus may heat the fixer for the image forming job (S610). The image forming apparatus may determine whether the voltage value of the output signal of the print medium detection sensor is in a predetermined range (S620). For example, the image forming apparatus may determine the voltage value of the output single of the print medium detection sensor by receiving an input through the ADC port and perform the determination by using a detection device (detection circuit) including the comparator.

If the voltage value of the output signal of the print medium detection sensor is in the predetermined range, the image forming apparatus may perform the job that is being currently performed, rather than performing the foreign body removing operation. If the voltage value of the output signal of the print medium detection sensor is not in the predetermined range, the image forming apparatus may drive the fan so that the voltage value of the output signal of the print medium detection sensor is in the predetermined range by removing the foreign body of the surface of the print medium detection sensor (S630). If the voltage value of the output signal is not in the predetermined range during the image forming job, the image forming apparatus may stop the image forming job. If the foreign body is not removed, the image forming apparatus may output information related to the contamination of the print medium detection sensor.

Figure 7:
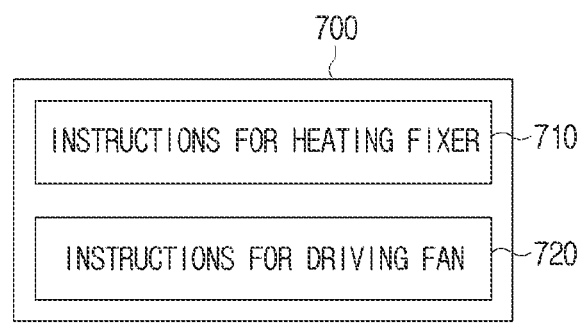
FIG. 7 is a diagram illustrating instructions stored in a computer readable recording medium according to an example.

FIG. 7 is a diagram illustrating instructions stored in a computer readable recording medium according to an example.

The foreign body removing process performed on the image forming apparatus may be implemented in a form of a computer readable recording medium storing instructions or data executable by a computer or a processor. A computer readable recording medium 700 may store instructions related to the operations of the image forming apparatus described above. For example, the computer readable recording medium 700 may include instructions 710 for heating a fixer for the image forming job, and instructions 720 for driving the fan, if the voltage value of the output signal of the print medium detection sensor is not in the predetermined range.

Such a computer-readable recording medium may be a read-only memory (ROM), a random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk drive, a solid-state drive (SSD), and any device capable of storing instructions or software, related data, data files, and data structures, and providing instructions or software, related data, data files, and data structures to a processor or a computer so that the processor or the computer executes the instructions.

While examples of the disclosure have been shown and described, the disclosure is not limited to the aforementioned specific examples, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An image forming apparatus comprising:
   a fixer;
   a print medium detection sensor adjacent to the fixer and to detect movement of a print medium;
   a fan adjacent to the fixer and to the print medium sensor; and
   a processor to control the image forming apparatus to heat the fixer for an image forming job, and based on a voltage value of an output signal of the print medium detection sensor not being in a predetermined range, to drive the fan to remove a foreign body on a surface of the print medium detection sensor so that the voltage value of the output signal of the print medium detection sensor is in the predetermined range.

2. The image forming apparatus according to claim 1, wherein the processor comprises an analog-to-digital converter (ADC) port, the processor to receive an input of an output signal of the print medium detection sensor through the ADC port, and to determine whether a voltage value of the input output signal is in the predetermined range.

3. The image forming apparatus according to claim 1, wherein the processor, based on the voltage value of the output signal not being in the predetermined range during the image forming job, to stop the image forming job.

4. The image forming apparatus according to claim 1, further comprising:
   an output interface,
   wherein the processor, based on the foreign body not being removed, to output information related to contamination of the print medium detection sensor through the output interface.

5. The image forming apparatus according to claim 1, further comprising:
   a detection device,
   wherein the processor, based on the voltage value of the output signal of the print medium detection sensor not being in the predetermined range, to receive an input of a first signal through the detection device, and based on the first signal being input, to determine that the print medium detection sensor is contaminated with the foreign body.

6. The image forming apparatus according to claim 5, wherein the detection device comprising:
   a first comparator to detect whether a voltage value of a high voltage output of the print medium detection sensor is less than a minimum threshold value, and
   a second comparator to detect whether a voltage value of a low voltage output of the print medium detection sensor is greater than a maximum threshold value, and
   the detection device, based on an output voltage value of the first comparator being less than the minimum threshold value and an output voltage value of the second comparator being greater than the maximum threshold value, to output the first signal.

7. The image forming apparatus according to claim 6, wherein the detection device comprises a voltage distribution resistor,
   the first comparator to receive an input of a voltage of the minimum threshold value of the high voltage output of the print medium detection sensor through a positive terminal, to receive an input of a voltage value of the output signal through a negative terminal, and to operate as an open collector, and
   the second comparator to receive an input of a voltage of the maximum threshold value of the low voltage output of the print medium detection sensor through a negative terminal by the voltage distribution resistor, to receive an input of a voltage value of the output signal through a positive terminal, and to operate as an open collector.

8. A method for controlling an image forming apparatus, the method comprising:
   heating a fixer for an image forming job; and
   based on a voltage value of an output signal of the print medium detection sensor not being in a predetermined range, driving the fan to remove a foreign body on a surface of the print medium detection sensor so that the voltage value of the output signal of the print medium detection sensor is in the predetermined range.

9. The method for controlling an image forming apparatus according to claim 8, the method further comprising:
   receiving an input of a voltage value of an output signal of the print medium detection sensor through an analog-to-digital converter (ADC) port of a processor; and
   determining whether the input voltage value of the output signal is in the predetermined range.

10. The method for controlling an image forming apparatus according to claim 8, the method further comprising:
    based on the voltage value of the output signal not being in the predetermined range during the image forming job, stopping the image forming job.

11. The method for controlling an image forming apparatus according to claim 8, the method further comprising:
    based on the foreign body not being removed, outputting information related to contamination of the print medium detection sensor.

12. The method for controlling an image forming apparatus according to claim 8, the method further comprising:
    based on the voltage value of the output signal of the print medium detection sensor not being in the predetermined range, receiving an input of a first signal through the detection device; and
    based on the first signal being input, determining that the print medium detection sensor is contaminated with the foreign body.

13. The method for controlling an image forming apparatus according to claim 12, wherein the receiving the input of the first signal comprising:
    by a first comparator of the detection device, detecting whether a voltage value of a high voltage output of the print medium detection sensor is less than a minimum threshold value,
    by a second comparator of the detection device, detecting whether a voltage value of a low voltage output of the print medium detection sensor is greater than a maximum threshold value, and
    by a processor, based on an output voltage value of the first comparator being less than the minimum threshold value and an output voltage value of the second comparator being greater than the maximum threshold value, receiving an input of the first signal output from the detection device.

14. The method for controlling an image forming apparatus according to claim 13, the method further comprising:
    by the first comparator operating as an open collector, receiving an input of a voltage of the minimum threshold value of the high voltage output of the print medium detection sensor through a positive terminal and receiving an input of a voltage value of the output signal through a negative terminal; and
    by the second comparator operating as an open collector, receiving an input of a voltage of the maximum threshold value of the low voltage output of the print medium detection sensor through a negative terminal by a voltage distribution resistor and receiving an input of a voltage value of the output signal through a positive terminal.

15. A non-transitory computer-readable medium on which a program for performing a method for controlling an image forming apparatus is recorded, the recording medium comprising:
    instructions for heating a fixer for an image forming job; and
    instructions for, based on a voltage value of an output signal of a print medium detection sensor not being in a predetermined range, driving a fan so that the voltage value of the output signal of the print medium detection sensor is in the predetermined range by removing a foreign body on a surface of the print medium detection sensor.

* * * * *